United States Patent
Swift

(10) Patent No.: US 7,534,821 B2
(45) Date of Patent: May 19, 2009

(54) POLYMERIC AEROGEL NANOCOMPOSITES

(75) Inventor: Joseph A. Swift, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 628 days.

(21) Appl. No.: 11/201,082

(22) Filed: Aug. 11, 2005

(65) Prior Publication Data

US 2007/0037903 A1 Feb. 15, 2007

(51) Int. Cl.
*C08K 3/34* (2006.01)

(52) U.S. Cl. .................. 523/218; 524/492; 524/493; 524/495; 524/496

(58) Field of Classification Search ................ 523/218; 524/492, 493, 495, 496
See application file for complete search history.

(56) References Cited

U.S. PATENT DOCUMENTS

| | | | |
|---|---|---|---|
| 4,387,086 A | 6/1983 | Rosenthaler | |
| 5,774,510 A | 6/1998 | Izzard | |
| 5,789,075 A | 8/1998 | Frank et al. | |
| 6,005,012 A | 12/1999 | Hrubesh et al. | |
| 6,316,092 B1 | 11/2001 | Frank et al. | |
| 6,478,864 B1 | 11/2002 | Field | |
| 6,663,799 B2 | 12/2003 | Kokubo et al. | |
| 6,806,299 B2 | 10/2004 | Baumann et al. | |
| 2007/0027232 A1* | 2/2007 | Walsh et al. | 523/218 |

OTHER PUBLICATIONS

Cabot Corporation, "Nanogel Fine Particle Aerogel" (2003).*
Lerner, "Less Is More with Aerogels," The Industrial Physicist, pp. 26-30 (Oct./Nov. 2004).

* cited by examiner

*Primary Examiner*—Edward J Cain
(74) *Attorney, Agent, or Firm*—Oliff & Berridge, PLC

(57) ABSTRACT

A nanocomposite composition includes aerogel components and polymeric components and is capable of absorbing water in an amount that is less than an amount that can be absorbed by the polymeric resin components. The nanocomposite has decreased hydrophilicity and improved mechanical and electrical characteristics. Charging members, such as bias transfer rolls and bias transfer belts, include the nanocomposite material.

22 Claims, No Drawings

POLYMERIC AEROGEL NANOCOMPOSITES

BACKGROUND

This disclosure relates to novel compositions of matter based upon a nanocomposite comprising aerogel components and polymeric components. Embodiments relate generally to imaging members, and specifically to components of imaging members that provide electrical and mechanical functions and that comprise such nanocomposites.

In some typical imaging systems, toner images are electrostatically transferred to a relatively thin intermediate belt in a plurality of first transfer nips. The images are then electrostatically transferred in a second transfer nip to a hot transfuse member, such as a transfuse belt. The intermediate belt heats up after passage through the second transfer nip. However, prior to the first transfer nip, the temperature of the intermediate belt is cooled and maintained at a stable temperature condition. In this manner, the imaging system is "buffered" from the transfuse heat. The images on the transfuse belt are then Theologically transferred to paper in a third transfer nip.

Some components, such as bias charging rollers, bias charging blades, bias transfer rollers, transfix belts, transfuse rollers and belts, and bias transfer belts provide electrical, thermal, and mechanical functions in such conventional imaging systems. These components are typically made from composites of particle-filled, for example metal or carbon particle-filled, and/or ionic salt-filled, elastomeric materials. The polymers and certain of the filler materials generally included in these composites are typically hydrophilic. The components made from these hydrophilic composites have an affinity for water and can absorb from about 1 to 12 percent by weight of moisture upon immersion in liquid water or exposure to high humidity environments, and can, upon drying, desorb an equivalent amount of water. This absorption-desorption cycle is generally reversible and results in the swelling and shrinking of the composite in response to changes in environment and relative humidity. The subsequent change in mass and physical dimensions of a solid part made from these hydrophilic composites leads to a humidity expansion coefficient that can be unacceptably large, for example between 1.05 and 1.15. Such a large humidity expansion coefficient may, in turn, result in unwanted swelling and shrinkage of tightly mated components, such as for example, slip-fit assemblies. In addition, poor reliability and shortened useful lifetimes of components may result, because critical properties of the components, such as physical dimensions, electrical conductivity and mechanical modulus, may be instantly and adversely affected by environmental conditions, particularly in cases in which the components must cycle between cold, dry and hot, wet environments.

For example, typical ionic-salt filled elastomer components may have altered bulk and/or surface resistivity due to water that has absorbed onto and/or diffused into the material. Composites such as those used in conventional bias transfer rolls, for example, consist of a quaternary ionic salt in a soft, polyester type polyurethane resin system. Such conventional composites, particularly in the form of elastomeric foams, can absorb about 5 to about 12% by weight of water as the environment changes from a dry condition, such as less than about 10% relative humidity, to a wet condition, such as more than about 90% relative humidity. This water absorption may alter the electrical or the mechanical properties of the composite. For example, the addition of water to an elastomeric composite can decrease the electrical resistivity by more than an order of magnitude. Volume resistivity, which measures the ability of the material to pass electrical current under the influence of a direct current (d.c.) electric field, is an intrinsic property of the composite. Changes in resistivity occur because of the absorbed water's actions within the composite. For example, water occupies space, which simultaneously swells the polymer and increases the mobility of charge carriers within the space defined by the solid volume of the composite, and thus decreases resistivity. Water can also solubilize ionic salts, producing more charge carriers, which, in turn, can further decrease resistivity. The presence of water within the composite can also soften the polymer, decreasing, for example, the mechanical modulus and hardness of the composite and thereby increase the composite's stress relaxation and creep tendencies. These effects can cycle as a function of the changes in the local environment and cause undesirable fluctuations to these properties and to the performance of the composite in its intended application.

Alternately, the polymers and selected fillers may be hydrophobic, meaning that the composites made therefrom have a weak affinity for water and are likely to absorb only relatively small amounts of water or water vapor when exposed to a high humidity environments. While it is generally desirable to select hydrophobic polymers and fillers for applications requiring environmental stability, there is a need for more and lower cost materials options.

Efforts have been made to control and/or compensate for the adverse effects of environmental changes by using moisture barrier coatings on effected components. In addition, constant current power supplies and/or constant force nip-forming mechanisms are often used to compensate for local environmental variations. However, failures still occur because critical component properties may change in response to variations in temperature and humidity, especially over long periods of time.

Thus, there remains a need for materials having stable electrical and mechanical properties, with which to make components that perform both electrical and mechanical functions in imaging systems.

SUMMARY

Nanocomposite compositions comprising one or more aerogel components and one or more polymeric resin components, in which the nanocomposite compositions are capable of absorbing less water than an amount than the polymeric resin components, are provided. Nanocomposite compositions comprising one or more aerogel components in which the aerogel interacts with and occupies volume within the molecular structure of a polymer resin component to control and modify the hydrophobicity of the composite are provided. Imaging systems that include such nanocomposite compositions are also provided.

In embodiments, nanocomposite compositions comprise aerogel components blended with polymeric resin components.

In embodiments, nanocomposite compositions comprise aerogel components chosen from inorganic aerogels, organic aerogels, carbon aerogels, and mixtures thereof. In particular embodiments, carbon aerogels may be doped with a metal. In certain embodiments, nanocomposite compositions comprise aerogel components chosen from polymeric aerogels, colloidal aerogels, and mixtures thereof.

In embodiments, nanocomposite compositions comprise aerogel components including aerogel particles, powders, or dispersions having an average particle size of less than about 1 micron or less than about 500 Å. In embodiments, nanocomposite compositions comprise aerogel components including aerogel particles that appear as well dispersed single particles or as agglomerates of more than one particle or groups of particles within the composition.

In embodiments, nanocomposite compositions comprise aerogel components including aerogel particles having a porosity ranging from about 10% to at least about 50%. In certain embodiments, nanocomposite compositions comprise aerogel components including aerogel particles having pores less than or equal to about 500 nm. In particular embodiments, nanocomposite compositions comprise aerogel components including aerogel particles having a surface area of from about 40 to about 1000 m$^2$/g and densities as low as about 3 mg/cm$^2$. In particular embodiments, the aerogel particles consist of tangled, fractal-like chains of clusters of nano-size molecules, for example from about 3 to about 5 nm in size, and the chains form an interconnected structure surrounding air or gas filled space or pores that are extremely small, for example from about 10 to about 50 nm across.

In embodiments, nanocomposite compositions comprise aerogel components including aerogel particles that may physically interact with the polymer resin or alternately are chemically treated or modified to react with the polymer resin are provided. For example, protonation or acidification of the aerogel particles may be used to provide particles that hydrogen bond or alternately form ionic bonds with portions of the polymer molecular structure.

In embodiments, nanocomposite compositions comprise aerogel components having electrical resistivity greater than about $1.0\times10^{-4}$ Ω-cm, and in certain embodiments, having electrical resistivity of from about 0.05 to about $1\times10^8$ Ω-cm.

In embodiments, nanocomposite compositions comprise polymeric resin components comprising one or more elastomeric resin systems.

In embodiments, nanocomposite compositions comprise one or more conductivity-enhancing materials.

Separably provided are embodiments including charging and transfer members that comprise nanocomposite compositions comprising aerogel components and polymeric resin components. In embodiments, the charging and transfer members are chosen from bias charging rollers, bias transfer rolls and bias transfer belts.

DETAILED DESCRIPTION OF EMBODIMENTS

This disclosure provides material that is suitable for use in imaging systems for components that provide both electrical and mechanical functions, such as bias transfer rolls, bias transfer belts, and the like. The material is a nanocomposite comprising one or more aerogel components, optionally combined with one or more conductivity-enhancing materials, within a polymeric matrix.

Aerogel Components

Aerogels may be described, in general terms, as gels that have been dried to a solid phase by removing pore fluid. The term "aerogel" is used to indicate gels that have been dried so that the gel shrinks little during drying, preserving its porosity and related characteristics. In contrast, "hydrogel" is used to describe wet gels in which pore fluids are aqueous fluids. The term "pore fluid" describes fluid contained within pore structures during formation of the pore element(s).

An aerogel composite may be described as one or more aerogels combined with one or more suitable polymers, copolymers, or combinations thereof in which there is an interface between the aerogel elements and polymers that can be characterized as interpenetration therebetween. For example, a very low viscosity polymer, such as a melted thermoplastic resin or a dissolved polymer in a suitable solvent, may penetrate into and fill all or some of the pore volume of an aerogel. Alternatively or additionally, the aerogel may occupy some or all of the intermolecular, normally-void space within the structure of the polymer. Aerogel components can be defined as components made from such aerogel composites.

In various embodiments, the composite includes one or more aerogels, which are low-density microcellular materials characterized by low mass densities, large specific surface areas and very high porosities. In particular, aerogels are characterized by their unique structures that comprise a large number of small inter-connected pores. Aerogel chemical composition, nanostructure and physical properties can be controlled at the nanometer scale during the preparation process. For example, aerogel surface chemistries may be modified for various applications, for example, the aerogel surface may be modified by chemical substitution upon or within the molecular structure of the aerogel to have hydrophilic or hydrophobic properties. Aerogels are generally prepared by sol-gel polymerization of monomers in solution. After the solvent is removed, the polymerized material is pyrolyzed in an inert atmosphere to form the aerogel.

In embodiments, any suitable aerogel or mixture of aerogels may be used as the one or more aerogel components of the composite.

Aerogel components of embodiments may have porosities of from about 10% to at least about 50%, or more than about 90% to about 99.9%, in which the aerogel can contain 99.9% empty space. For example, the aerogel may suitably have a porosity of from about 50 to about 90% or more, such as from about 55 to about 99%. In embodiments, the pores of aerogel components may have diameters of less than about 500 nm or less than about 50 nm in size. For example, the average pore diameter of the aerogel may be from about 10 or less to about 100 mn. In particular embodiments, aerogel components may have porosities of more than 50% pores with diameters of less than 100 nm and even less than about 20 nm. In embodiments, the aerogel components may be in the form of particles having a shape that is spherical, or near-spherical, cylindrical, rod-like, bead-like, cubic, platelet-like, and the like.

Generally, the type, porosity, pore size, and amount of aerogel used for a particular embodiment may be chosen based upon the desired properties of the resultant composition and upon the properties of the polymers and solutions thereof into which the aerogel is being combined. For example, if a pre-polymer (such as a low molecular weight polyurethane monomer that has a relatively low process viscosity, for example less than 10 centistokes) is chosen for use in an embodiment, then a high porosity, for example greater than 80%, and high specific surface area, for example >about 500 m$^2$/gm, aerogel having relatively small pore size, for example less than about 50 to about 100 nm, may be mixed at relatively high concentrations, for example greater than about 2 to about 20% by weight, into the pre-polymer by use of moderate-to-high energy mixing techniques, for example by controlled temperature, high shear, blending. If a hydrophilic-type aerogel is used, upon cross-linking and curing/post curing the pre-polymer to form an infinitely long matrix of polymer and aerogel filler, the resultant composite may exhibit improved hydrophobicity and increased hardness when compared to a similarly prepared sample of unfilled polymer. The improved hydrophobicity may be derived from the polymer and aerogel interacting during the liquid-phase processing whereby a portion of the molecular chain of the polymer interpenetrates into the pores of the aerogel and the non-pore regions of the aerogel serves to occupy some or all of the intermolecular space that where water molecules could otherwise enter and occupy.

The continuous and monolithic structure of interconnecting pores that characterizes aerogel components also leads to high surface areas and, depending upon the material used to comprise the aerogel, the electrical conductivity may range from highly thermally and electrically conducting to highly thermally and electrically insulating. Further, aerogel components in embodiments may have surface areas ranging from about 400 to about 1200 $m^2/g$, such as from about 500 to about 1200 $m^2/g$, or from about 700 to about 900 $m^2/g$. In embodiments, aerogel components may have electrical resistivities greater than about $1.0\times10^{-4}$ $\Omega$-cm, such as in a range of from about 0.01 to about $1.0\times10^{16}$ $\Omega$-cm, from about 1 to about $1.0\times10^8$ $\Omega$-cm, or from about 50 to about 750,000 $\Omega$-cm. Different types of aerogels used in various embodiments may also have electrical resistivities that span from conductive, about 0.01 to about 1.00 $\Omega$-cm, to insulating, more than about $10^{16}$ $\Omega$-cm. Conductive aerogels of embodiments, such as carbon aerogels, may be combined with other conductive fillers to produce combinations of physical, mechanical, and electrical properties that are otherwise difficult to obtain. For example, a combination of carbon aerogel and carbon fiber may be added to a suitable polymer, such as a solution of polyphenylene sulfide (PPS), and then dried to yield a solid composite that may have a relatively high modulus, a very low coefficient of humidity expansion, a low resistivity, and stable dimensions.

Aerogels that can suitably be used in embodiments may be divided into three major categories: inorganic aerogels, organic aerogels and carbon aerogels. In embodiments of the composites, the composite may contain one or more aerogels chosen from inorganic aerogels, organic aerogels, carbon aerogels and mixtures thereof. For example, embodiments can include multiple aerogels of the same type, such as combinations of two or more inorganic aerogels, combinations of two or more organic aerogels, or combinations of two or more carbon aerogels, or can include multiple aerogels of different types, such as one or more inorganic aerogels, one or more organic aerogels, and/or one or more carbon aerogels. For example, a chemically modified, hydrophobic silica aerogel may be combined with a high electrical conductivity carbon aerogel to simultaneously modify the hydrophobic and electrical properties of a composite and achieve a desired target level of each property.

Inorganic aerogels, such as silica aerogels, are generally formed by sol-gel polycondensation of metal oxides to form highly cross-linked, transparent hydrogels. These hydrogels are subjected to supercritical drying to form inorganic aerogels.

Organic aerogels are generally formed by sol-gel polycondensation of resorcinol and formaldehyde. These hydrogels are subjected to supercritical drying to form organic aerogels.

Carbon aerogels are generally formed by pyrolyzing organic aerogels in an inert atmosphere. Carbon aerogels are composed of covalently bonded, nanometer-sized particles that are arranged in a three-dimensional network. Carbon aerogels, unlike high surface area carbon powders, have oxygen-free surfaces, which can be chemically modified to increase their compatibility with polymer matrices. In addition, carbon aerogels are generally electrically conductive, having electrical resistivities of from about 0.005 to about 1.00 $\Omega$-cm. In particular embodiments, the composite may contain one or more carbon aerogels and/or blends of one or more carbon aerogels with one or more inorganic and/or organic aerogels.

Carbon aerogels that may be included in embodiments exhibit two morphological types, polymeric and colloidal, which have distinct characteristics. The morphological type of a carbon aerogel depends on the details of the aerogel's preparation, but both types result from the kinetic aggregation of molecular clusters. That is, nanopores, primary particles of carbon aerogels that may be less than 20 Å (Angstroms) and that are composed of intertwined nanocrystalline graphitic ribbons, cluster to form secondary particles, or mesopores, which may be from about 20 to about 500 Å. These mesopores can form chains to create a porous carbon aerogel matrix. The carbon aerogel matrix may be dispersed, in embodiments, into polymeric matrices by, for example, suitable melt blending or solvent mixing techniques.

In embodiments, carbon aerogels may be combined with, coated, or doped with a metal to improve conductivity, magnetic susceptibility, and/or dispersibility. Metal-doped carbon aerogels may be used in embodiments alone or in blends with other carbon aerogels and/or inorganic or organic aerogels. Any suitable metal, or mixture of metals, metal oxides and alloys may be included in embodiments in which metal-doped carbon aerogels are used. In particular embodiments, and in specific embodiments, the carbon aerogels may doped with one or more metals chosen from transition metals (as defined by the Periodic Table of the Elements) and aluminum, zinc, gallium, germanium, cadmium, indium, tin, mercury, thallium and lead. In particular embodiments, carbon aerogels are doped with copper, nickel, tin, lead, silver, gold, zinc, iron, chromium, manganese, tungsten, aluminum, platinum, palladium, and/or ruthenium. For example, in embodiments, copper-doped carbon aerogels, ruthenium-doped carbon aerogels and mixtures thereof may be included in the composite.

In embodiments, the aerogel components may have one or more particular properties or characteristics. For example, the aerogel components may comprise extremely fine particles, of less than about 500 Å; the aerogel components may have a low density; or the aerogel components may be surface activated, for example by protonation or acidification. Aerogel particles having one or a combination of these or other properties may be dispersed, in embodiments, into a polymer matrix to provide desirable effects.

For example as noted earlier, in embodiments in which the aerogel components comprise nanometer-scale particles, these particles or portions thereof can occupy inter- and intra-molecular spaces within the molecular lattice structure of the polymer, and thus can prevent water molecules from becoming incorporated into those molecular-scale spaces. Such blocking may decrease the hydrophilicity of the overall composite. In addition, many aerogels are hydrophobic. Incorporation of hydrophobic aerogel components may also decrease the hydrophilicity of the composites of embodiments. Composites having decreased hydrophilicity, and any components formed from such composites, have improved environmental stability, particularly under conditions of cycling between low and high humidity.

In addition, the porous aerogel particles may interpenetrate, intertwine with, or react with the polymer and thereby strengthen the polymeric lattice. The mechanical properties of the overall composite of embodiments in which aerogel particles have interpenetrated or interspersed with the polymeric lattice may thus be enhanced and stabilized.

Electrical properties of the composite may also be modified, in embodiments, by the aerogel components. For example, by selecting particular aerogel types and conductivities, composites having particular resistivities can be obtained. For example, composites having resistivities appropriate for use in imaging member components, as discussed above, may be prepared.

Polymer Components

In embodiments, any suitable polymer, copolymer, mixture of polymers, mixture of copolymers, or blends thereof may be used as the one or more polymeric components of the composite. In certain embodiments, the polymer components may include one or more elastomeric resins.

In embodiments, any suitable elastomeric resin may be used. In certain embodiments, the polymer components may comprise any low viscosity, thermal- or moisture- curable elastomeric system, such as, for example liquid cast-able polyurethanes or silicones, and/or may comprise gum millable rubbers such as polyurethanes, silicones, ethylene propylene hexadienes, epichlorohydrins, natural butyl rubbers, and the like, and mixtures thereof. The polymeric component of specific embodiments may comprise one or more polyester-type polyurethanes.

Illustrative examples of suitable elastomeric resins for use in embodiments include natural resins, such as epichlorohydrins; natural rubbers, such as natural butyl rubbers; vinyl or styrene resins, polyesters, and the like, and mixtures thereof. Examples of suitable resins include, but are not limited to, styrene methacrylate; polyolefins; styrene acrylates, such as PSB-2700 (obtained from Hercules-Sanyo Inc.); polyesters; styrene butadienes; cross-linked styrene polymers; epoxies; polyethylenes, polyurethanes; vinyl resins, including homopolymers or copolymers of two or more vinyl monomers; and polymeric esterification products of a dicarboxylic acid and a diol comprising a diphenol. Other suitable vinyl monomers include, but are not limited to, styrene; p-chlorostyrene; unsaturated mono-olefins such as ethylene, propylene, butylene, isobutylene and the like; saturated mono-olefins such as vinyl acetate, vinyl propionate, and vinyl butyrate; vinyl esters such as esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, and acrylamide; and the like; and mixtures thereof.

Selection of polymer components for embodiments requires consideration of target critical properties, processability, compatibility with fillers, cost, and the like.

A nanocomposite can be defined as a combination of more than one material where one material represents filler and the other serves as a binder and wherein at least one of the components has nanoscale dimensions. Thus, by example, a polyurethane filled with 15% by weight carbon aerogel represents a nanocomposite. Nanocomposites may be produced and used as the filler phase to produce other, more complex nanocomposites. Such complex nanocomposites enable unique combinations of otherwise difficult to obtain properties to be developed within a single component.

In embodiments, the nanocomposite material may comprise at least the above-described aerogel blended with or dispersed in the polymer component. In particular embodiments, the aerogel is uniformly dispersed in the polymer component, although non-uniform dispersion can be used in embodiments to achieve specific goals. For example, in embodiments, the aerogel can be non-uniformly dispersed in the polymer component to provide a high concentration of the aerogel in surface layers, substrate layers, different portions of a single layer, or the like.

Any suitable amount of the aerogel may be incorporated into the polymer component, to provide desired results. For example, the nanocomposite may be formed from about 0.2 to about 20 parts by weight aerogel and from about 80 to about 99.8 parts by weight polymer component. To achieve a high level of hydrophobicity, the aerogel component must be combined with the polymer component so that the dispersed aerogel component saturates all, or a large portion, of the intermolecular void spaces in the polymer component that could be occupied by water molecules. In particular embodiments, the aerogel component is provided in a minimum amount necessary to provide the desired results.

Aerogel composites may result from the incorporation, in embodiments, of additives into the aerogel components and/or the polymer components. Additives, including those described herein, may be included in known amounts for their known purposes. Additives that may be combined with the polymer to from the aerogel compositions of embodiments include, for example, zinc stearate or polyethylene, which may serve as an internal lubricant for use in applications requiring the composite to have low frictional properties; dry lubricants, such as polytetrafluorethylene (PTFE); conductivity enhancing materials; thermal conductivity modifiers; filler materials including but not limited to reinforcing fillers, such as fiber glass mat or roving; extenders, such as inert clay; dispersant aides; surfactants; emulsifiers; and the like; and mixtures thereof may be used in embodiments.

In embodiments, one or more conductivity enhancing materials may be included in the composite, and in specific embodiments, two or more conductivity enhancing materials may be included. Suitable conductivity enhancing materials for use in embodiments may be selected from metal powders, shards, or flakes, carbon blacks, single or multi-walled carbon nanotubes, closed- or open-ended carbon nanotubes, fullerenes, graphite powders, carbon fibers, graphite fibers, metal nanowires, metal nanorods, metal nanotubes, metal nanodots, doped silicon metal nanostructures, boron nitride or boron carbon nitride nanostructures, ionic salts, and mixtures thereof. In specific embodiments, quaternary ionic salts, such as tetraheptylammonium bromide and the like, may be included as a conductivity enhancing material.

In embodiments, the composite may be included in charging or transfer members, such as bias transfer rolls or rollers, bias transfer belts and the like, for imaging systems, such as electrophotographic systems. Such imaging systems may use any suitable conventional electrophotographic charging, exposure, development, transfer, fixing and cleaning techniques may be utilize to form and develop electrostatic latent images. Thus, for example, conventional light lens or laser exposure systems may be used to form the electrostatic latent image. The resulting electrostatic latent image may be developed by suitable conventional development techniques such as magnetic brush, cascade, powder cloud, and the like.

The charging members of embodiments may comprise a nanocomposite material coated over a suitable substrate or core material. For example, the substrate or core may be a solid shaft or hollow cylinder or core fabricated from any suitable metal such as aluminum, anodized aluminum, steel, nickel, copper, and the like. Alternatively, the substrate or core may be a hollow cylinder or core fabricated from non-metallic materials, such as conductive polymers or the like, or the substrate or core may be an endless belt of similar construction. Generally a suitable interface layer, such as a primer and/or adhesive, may be used to adhere the core or substrate and the next outer layer. The nanocomposite then may be applied to the core member by suitable process, such as insert molding, extrusion, cast molding, solvent coating, and the like, to form the subject charging or transfer device component. Alternate additional layers may be used as, for example wear resistant or protective layers as may be required for particular applications.

While the disclosure has been described in conjunction with the specific embodiments described above, it is evident that many alternatives, modifications and variations are apparent to those skilled in the art. Accordingly, the preferred embodiments of the disclosure as set forth above are intended to be illustrative and not limiting. Various changes can be made without departing from the spirit and scope of the disclosure.

EXAMPLES

Example 1

A liquid cast-able, polyester type polyurethane, which has relatively low moisture uptake, for example from 1.0 to about 3% by weight is combined with a high conductivity carbon-type aerogel, CA AEROGEL (available from Aerogel Composite LLC), by mechanical dispersion at a concentration sufficient to achieve a specified target bulk resistivity, such as within the range of $1.0 \times 10^{-2}$ to $5.0 \times 10^{+8}$ ohm-cm. Moderate heating of the prepolymer may be used to lower the viscosity of the polymer resin during blending with the aerogel and before addition of any suitable curing agent(s). The composite is solidified by thermal curing and post cured if needed to complete the cross-linking reactions or remove any remaining volatile constituents. Through the addition of the aerogel, the electrical conductivity of the composite is reduced by many orders and the moisture uptake may be reduced by a factor of 2 to about 5.

Example 2

A liquid cast-able, polyester type polyurethane, which has relatively low moisture uptake, is combined with a copper-doped carbon aerogel by mechanical dispersion at a concentration sufficient to achieve a specified target bulk resistivity, such as $1 \times 10^{-4}$ to $5 \times 10^{-2}$ ohm-cm. The composite is solidified by thermal curing. The composite comprising copper-doped carbon aerogel of Example 2 may exhibit greater conductivity and disperse-ability in some cases, than the composite of Example 1.

Example 3

A liquid cast-able, polyester type polyurethane, which has relatively high moisture uptake, for example from about 3 to 7% by weight is combined with a high conductivity carbon-type aerogel, CA AEROGEL, and a conductivity enhancing material, polyacrylonitrile (PAN) type chopped carbon fiber, by mechanical dispersion at a concentration sufficient to achieve a specified target bulk resistivity, such as $3.0 \times 10^{-5}$ to $9 \times 10^{-5}$ ohm-cm. The composite is solidified by thermal curing. The composite comprising copper-doped carbon aerogel of Example 3 may exhibit a greater level of conductivity control and disperse-ability in some cases, than the composite of Example 1. In addition, electrical properties of the composite of Example 3 may be fine-tuned to achieve stability of bulk resistivity to a wide range of applied fields, while decreasing considerably the moisture uptake of the composite.

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanocomposite composition comprising:
   one or more aerogel components, and
   one or more polymeric resin components;
   wherein the nanocomposite composition is capable of absorbing water in an amount that is less than an amount that can be absorbed by the polymeric resin components, and
   wherein the one or more aerogel components comprise aerogel particles having an average particle size of less than about 500 Å.

2. The nanocomposite composition according to claim 1, wherein the one or more aerogel components are blended with the polymeric resin components.

3. The nanocomposite composition according to claim 1, wherein the one or more aerogel components is selected from the group consisting of inorganic aerogels, organic aerogels, carbon aerogels, and mixtures thereof.

4. The nanocomposite composition according to claim 3, wherein the one or more aerogel components is selected from the group consisting of carbon aerogels and mixtures thereof.

5. The nanocomposite composition according to claim 4, wherein the carbon aerogel is doped with at least one metal.

6. The nanocomposite composition according to claim 5, wherein the at least one metal is a metal selected from the group consisting of transition metals, aluminum, zinc, gallium, germanium, cadmium, indium, tin, mercury, thallium, lead, copper and ruthenium.

7. The nanocomposite composition according to claim 1, wherein the one or more aerogel components is selected from the group consisting of polymeric aerogels, colloidal aerogels, and mixtures thereof.

8. The nanocomposite composition according to claim 1, wherein the one or more aerogel components comprises aerogel particles having a porosity greater than or equal to about 50%.

9. The nanocomposite composition according to claim 1, wherein the one or more aerogel components comprises aerogel particles having pores less than or equal to about 100 nanometers in diameter.

10. The nanocomposite composition according to claim 1, wherein the one or more aerogel components comprises aerogel particles having a surface area of from about 400 to about 1200 m²/g.

11. The nanocomposite composition according to claim 1, wherein the one or more aerogel components has an electrical resistivity greater than about $1.0 \times 10^{-4}$ Ω-cm.

12. The nanocomposite composition according to claim 11, wherein the one or more aerogel components has an electrical resistivity of from about 0.05 to about $1.0 \times 10^8$ Ω-cm.

13. The nanocomposite composition according to claim 1, wherein the one or more of the polymeric resin components comprise one or more elastomeric resin systems.

14. The nanocomposite composition according to claim 13, wherein the one or more elastomeric resin systems is selected from the group consisting of polyethylenes, polyurethanes, silicones, ethylene propylene hexadienes, epichlorohydrins, natural butyl rubbers, and mixtures thereof.

15. The nanocomposite composition according to claim 14, wherein the one or more elastomeric resin systems comprise one or more polyester-type polyurethane.

16. The nanocomposite composition according to claim 1, further comprising one or more conductivity-enhancing materials.

17. The nanocomposite composition according to claim 16, wherein the one or more conductivity-enhancing materials is selected from the group consisting of carbon blacks, graphite powders, ionic salts, and mixtures thereof.

18. The nanocomposite composition according to claim 1, further comprising one or more materials selected from the group consisting of zinc stearate, polyethylene, dry lubricants, conductivity enhancing materials; thermal conductivity modifiers, filler materials, extenders, dispersant aides, surfactants, emulsifiers, and mixtures thereof.

19. A charging member for an electrophotographic printing device, comprising a nanocomposite composition comprising
   one or more aerogel components, and
   one or more polymeric resin components,
   wherein the one or more aerogel components comprise aerogel particles having an average particle size of less than about 500 Å.

20. The charging member according to claim 19, further comprising a substrate layer, wherein the nanocomposite composition is coated on the substrate layer.

21. The charging member according to claim 19, wherein the charging member is selected from the group consisting of bias transfer rolls and bias transfer belts.

22. An electrographic image development device, comprising:
   an imaging member, and
   a charging member, the charging member comprising a nanocomposite composition comprising one or more aerogel components and one or more polymeric resin components,
   wherein the one or more aerogel components comprise aerogel particles having an average particle size of less than about 500 Å.

* * * * *